(12) United States Patent
Weaver et al.

(10) Patent No.: US 9,500,096 B2
(45) Date of Patent: Nov. 22, 2016

(54) SUPER EFFICIENT REGULATOR

(71) Applicant: National Oilwell Varco, L.P., Houston, TX (US)

(72) Inventors: Walter Warren Weaver, Richmond, TX (US); Frank Benjamin Springett, Spring, TX (US); Eric Trevor Ensley, Cypress, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 251 days.

(21) Appl. No.: 14/086,140

(22) Filed: Nov. 21, 2013

(65) Prior Publication Data

US 2014/0096513 A1 Apr. 10, 2014

Related U.S. Application Data

(63) Continuation of application No. 12/859,513, filed on Aug. 19, 2010, now Pat. No. 8,616,861.

(60) Provisional application No. 61/235,005, filed on Aug. 19, 2009.

(51) Int. Cl.
*F03B 13/00* (2006.01)
*F01D 15/06* (2006.01)
*F03B 15/00* (2006.01)

(52) U.S. Cl.
CPC ............. *F01D 15/06* (2013.01); *F01D 15/062* (2013.01); *F03B 13/00* (2013.01); *F03B 15/00* (2013.01); *Y02E 10/226* (2013.01)

(58) Field of Classification Search
CPC ........ F03B 13/00; F03B 15/00; F01D 15/06; F01D 15/062; Y02E 10/226; F15B 2211/214; F15B 2211/40546
USPC ...................... 417/225, 379, 391, 46; 60/419
See application file for complete search history.

(56) References Cited

U.S. PATENT DOCUMENTS 4,525,631 A * 6/1985 Allison ................... F03D 9/001
290/4 R

* cited by examiner

*Primary Examiner* — Bryan Lettman
*Assistant Examiner* — Philip Stimpert
(74) *Attorney, Agent, or Firm* — Conley Rose, P.C.

(57) ABSTRACT

A system for producing mechanical energy. In some embodiments, the system includes a first source providing a first fluid, a fluid pressurization device, a second source supplying a second fluid, a first motor, and a second motor. The fluid pressurization device draws in the first fluid from the first source and increases the pressure of the first fluid. The first motor is driven by the second fluid, the second fluid decreasing in pressure and the first motor powering the fluid pressurization device as the second fluid passes through the first motor. The second motor receives a mixture of the first fluid from the first motor and the second fluid from the fluid pressurization device, whereby the second motor produces the mechanical energy.

18 Claims, 3 Drawing Sheets

SUPER EFFICIENT REGULATOR

CROSS-REFERENCE TO RELATED APPLICATIONS

This application is a continuation of U.S. application Ser. No. 12/859,513 filed Aug. 19, 2010, and entitled "Super Efficient Regulator," which claims the benefit of U.S. provisional application Ser. No. 61/235,005 filed Aug. 19, 2009, and entitled "Super Efficient Regulator," which is hereby incorporated herein by reference in its entirety for all purposes.

BACKGROUND

This disclosure relates generally to pneumatic or hydraulic systems that produce mechanical energy, or work. In particular, the disclosure relates to a pneumatic, or hydraulic, system with a regulator formed by a motor that enables pressure reduction of a fluid and produces mechanical energy that may be used to drive a compressor, or pump.

Many conventional pneumatic systems include a motor to which compressed air is delivered. In turn, the motor produces mechanical energy, or work, that may be used, for example, to power a hand-held tool. To control the pressure of compressed air delivered to the motor, the pneumatic system may also include a regulator positioned upstream of the motor. Compressed air is delivered through the regulator, causing a reduction in the pressure of the compressed air such that the pressure of compressed air delivered to the motor is at a desired level.

FIG. 1 illustrates a conventional pneumatic system. Pneumatic system 10 includes a source of compressed air 15, a motor 20, a regulator 25 disposed upstream of motor 20, and an actuatable device 30 coupled to motor 20. Compressed air is delivered from source 15 through regulator 25 to motor 20. Assuming isentropic flow through motor 20 and potential and kinetic energy are negligible, the amount of mechanical energy, or work, $W_{prod,20}$ produced by motor 20 may be calculated using the First Law of Thermodynamics, which under the assumed conditions, simplifies to:

$$W_{prod,20} = \dot{m}^*(h_3 - h_2) \quad (1)$$

where $h_2$ is the enthalpy of compressed air entering motor 20; $h_3$ is the enthalpy of compressed air exiting motor 20; and $\dot{m}$ is the flow rate of compressed air through system 10. In pneumatic system 10 illustrated by FIG. 1, equation (1), and equation (2), included below, the subscript "3" denotes a property of compressed air exiting motor 20. Thus, $h_3$ represents the enthalpy of compressed air exhausted motor 20. The subscript "2" denotes a property of compressed air exiting regulator 25 and entering motor 20. The subscript "1" denotes a property of compressed air supplied by source 15 to regulator 25.

Work $W_{prod,20}$ produced by motor 20 is then used to actuate device 30. As previously mentioned, device 30 may be a hand-held tool powered by motor 20. Alternatively, device 30 may be an object that is lifted or moved, such as a hydraulic cylinder in a blowout preventer. Moreover, device 30 may be a generator. In short, device 30 may be any apparatus that is actuated by mechanical energy.

As compressed air flows through pneumatic system 10 and work $W_{prod,20}$ is produced by motor 20, energy is removed from the compressed air as it passes through regulator 25 to enable pressure reduction of the compressed air. Because the energy removed is not utilized, it may be considered wasted. The amount of energy wasted $W_{wasted}$ may be calculated using an Exergy Rate Balance Equation, which under the assumed conditions, simplifies to:

$$W_{wasted} = \dot{m}^*(h_2 - h_1) \quad (2)$$

Depending on the design configuration of regulator 25, the energy wasted $W_{wasted}$ as the compressed air passes through regulator 25 maybe significant, and particularly so when compared to the amount of work produced $W_{prod,20}$ by motor 20.

For exemplary purposes, the following conditions are assumed: the pressure $P_1$ and temperature $T_1$ of compressed air delivered from source 15 to regulator 25 are 20 MPa and 300° K., respectively; the compressed air flowrate $\dot{m}$ through system 10 is 1 kg/second; a pressure reduction of 19 MPa occurs through regulator 25; and compressed air exits motor 20 with a pressure $P_3$ of 0.2 MPa. Based on these conditions, the state of compressed air entering regulator 25 may be fully defined: pressure $P_1$=20 MPa (given), temperature $T_1$=300° K. (given), enthalpy $h_1$=267.80 kJ/kg, and entropy $s_1$=5.25 kJ/kg. Next, the state of compressed air exiting regulator 25 and entering motor 20 may be fully defined. Given an assumed 19 MPa pressure reduction through regulator 25 and isentropic flow through regulator 25, the properties of compressed air exiting regulator 25 and entering motor 20 are: $P_2$=$P_1$-19 MPa, or 1 MPa, entropy $s_2$=$s_1$=5.25 kJ/kg, enthalpy $h_2$=110.20 kJ/kg, and temperature $T_2$=123.75° K. Lastly, the state of compressed air exiting motor 20 may be defined. Based on the assumed pressure $P_3$=0.2 MPa at the exit of motor 20 and isentropic flow through motor 20, the properties of compressed air exiting motor 20 are: pressure $P_3$=0.2 MPa (given), entropy $s_3$=$s_2$=5.25 kJ/kg, enthalpy $h_3$=69.32 kJ/kg, and temperature $T_3$=87.75° K.

Having fully defined the state of compressed air entering regulator 25, exiting regulator 25 (also entering motor 20), and exiting motor 20, the work produced $W_{prod,20}$ by motor 20 is estimated to be 55 hp using equation (1). Also, the work wasted $W_{wasted}$ as compressed air passes through regulator 25 is estimated to be 211 hp using equation (2). As demonstrated, a significant amount of energy is wasted during pressure reduction of the compressed air as it passes through regulator 25.

Accordingly, apparatus or systems that enable use of the energy removed from the compressed air during pressure reduction are desirable.

SUMMARY OF THE DISCLOSED EMBODIMENTS

A system including a super efficient regulator is disclosed. In some embodiments, the super efficient regulator includes a motor driven by a first fluid, the first fluid decreasing in pressure and the motor producing mechanical energy as the first fluid passes through the motor, and a device powered by the mechanical energy produced by the motor, the device increasing a pressure of a second fluid. The first fluid exhausted by the motor and the second fluid exhausted the device have substantially equal pressures.

A system for producing mechanical energy. In some embodiments, the system includes a first source providing a first fluid, a fluid pressurization device, a second source supplying a second fluid, a first motor, and a second motor. The fluid pressurization device draws in the first fluid from the first source and increases the pressure of the first fluid. The first motor is driven by the second fluid, the second fluid decreasing in pressure and the first motor powering the fluid pressurization device as the second fluid passes through the first motor. The second motor receives a mixture of the first fluid from the first motor and the second fluid from the fluid pressurization device, whereby the second motor produces the mechanical energy.

Some methods for producing mechanical energy include conveying a first fluid through a first motor, powering a fluid pressurization device by the first motor as the first fluid passes through the first motor, increasing the pressure of a second fluid passing through the fluid pressurization device, and supplying at least one of the first fluid from the first motor and the second fluid from the fluid pressurization device to a second motor, whereby the second motor produces the mechanical energy.

Thus, embodiments described herein comprise a combination of features and advantages intended to address various shortcomings associated with conventional pneumatic or hydraulic systems having a regulator, or similar pressure reduction device. The various characteristics described above, as well as other features, will be readily apparent to those skilled in the art upon reading the following detailed description of the preferred embodiment, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

Figure 1:
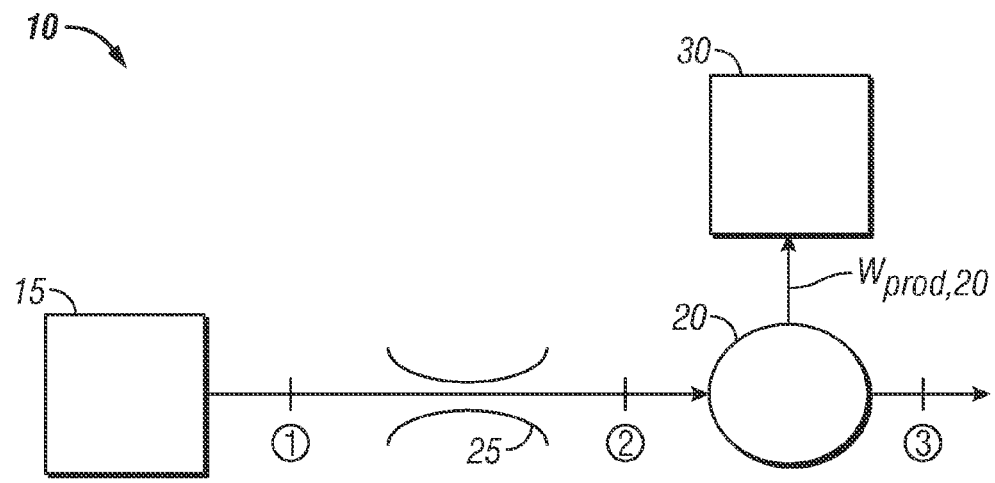
FIG. 1 is a schematic representation of a conventional pneumatic system.

The following description is directed to exemplary embodiments of a pneumatic or hydraulic system with an efficient or super efficient regulator. The embodiments disclosed should not be interpreted, or otherwise used, as limiting the scope of the disclosure, including the claims. One skilled in the art will understand that the following description has broad application, and that the discussion is meant only to be exemplary of the described embodiments, and not intended to suggest that the scope of the disclosure, including the claims, is limited to those embodiments.

Certain terms are used throughout the following description and claims to refer to particular features or components. As one skilled in the art will appreciate, different persons may refer to the same feature or component by different names. This document does not intend to distinguish between components or features that differ in name but not function. Moreover, the drawing figures are not necessarily to scale. Certain features and components described herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

Figure 2:
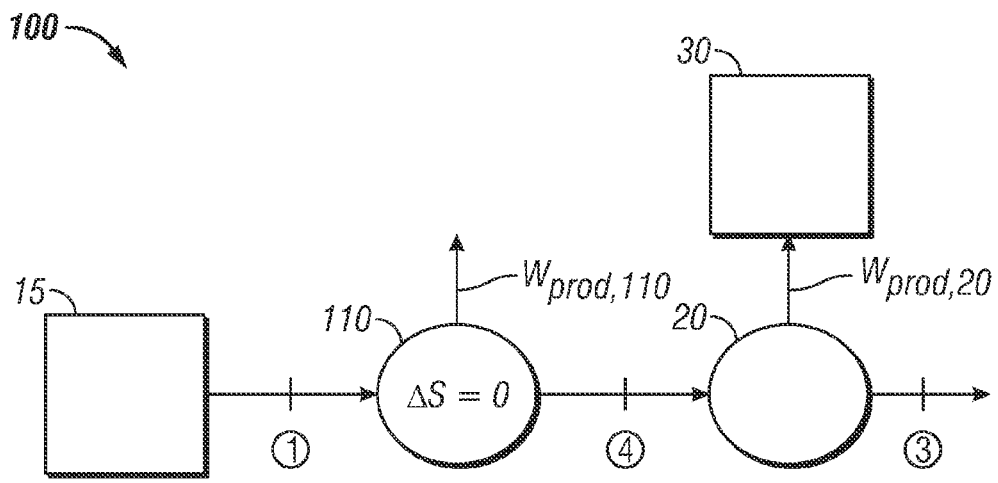
FIG. 2 is a schematic representation of a pneumatic system with an efficient regulator in accordance with the principles disclosed herein.

Referring now to FIG. 2, there is shown a pneumatic system 100 in accordance with the principles disclosed herein. Pneumatic system 100 is similar to conventional pneumatic system 10 in that system 100 also includes motor 20, compressed air source 15, and actuatable device 30. As previously described, compressed air is delivered from source 15 to motor 20. Motor 20, in turn, produces mechanical energy, or work, $W_{prod,20}$ that may be used to actuate device 30. Source 15 may provide an unlimited supply of compressed air, such as a line extending from a compressor that may be operated continuously. Alternatively, source 15 may provide a limited supply of compressed air, such as but not limited to a portable tank having a finite storage volume. Device 30 is an apparatus that is actuated by mechanical energy, and in some embodiments, is a hydraulic cylinder on a blowout preventer (BOP) installed on a subsea wellhead.

In contrast to pneumatic system 10, pneumatic system 100 further includes a motor 110 in place of regulator 25. Thus, compressed air from source 15 passes through motor 110, rather than regulator 25, to motor 20. Like regulator 25, motor 110 enables a pressure reduction of the compressed air flowing therethrough. In this way, motor 110 may be considered a regulator. However, unlike regulator 25, motor 110 enables the production of mechanical energy, or work, that may be used in some manner. As such, motor 110 is considered an efficient regulator.

The amount of work produced by motor 110, $W_{prod,110}$, may be calculated using the First Law of Thermodynamics, which under the assumed conditions, simplifies to:

$$W_{prod,110} = \dot{m}^*(h_4 - h_1) \quad (3)$$

where $h_1$ is the enthalpy of compressed air entering motor 110; $h_4$ is the enthalpy of compressed air exiting motor 110; and $\dot{m}$ is the flow rate of compressed air through pneumatic system 100. In pneumatic system 100 illustrated by FIG. 2 and equation (3), the subscript "4" denotes a property of compressed air exiting motor 110 and entering motor 20. The subscripts "1" and "3" remain as defined above.

Assuming motor 110 is configured to produce the same pressure reduction in compressed air passing through it as regulator 25 and isentropic flow through motor 110, the properties of compressed air entering motor 20 from motor 110 are the same as those of compressed air entering motor 20 from regulator 25 (i.e., $P_2=P_4$, $T_2=T_4$, $h_2=h_4$, and $s_2=s_4$). The work produced by motor 110, $W_{prod,110}$, is then estimated to be 211 hp, assuming the same flow rate in through pneumatic system 100 as that through pneumatic system 10. Hence, replacement of regulator 25 with motor 110 enables the production of 211 hp of useful work. This is beyond that produced by motor 20, which was previously estimated to be 55 hp.

Figure 3:
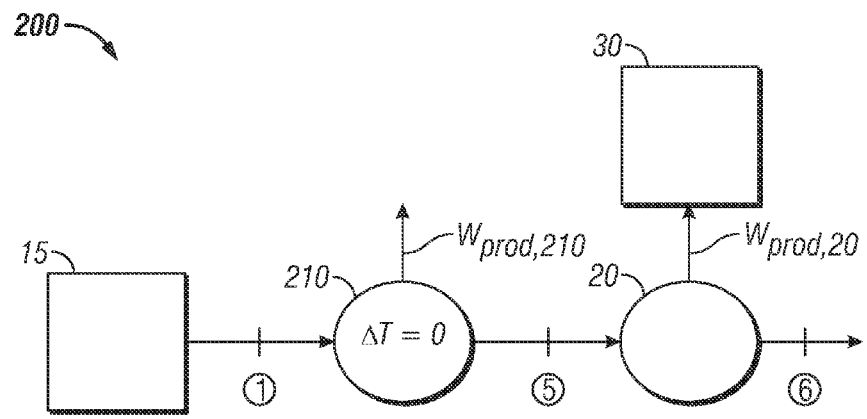
FIG. 3 is a schematic representation of a pneumatic system with another embodiment of an efficient regulator in accordance with the principles disclosed herein.

Flow through pneumatic system 100 is assumed to be isentropic. Further gains in the production of useful work may be realized under isothermal, rather than isentropic, flow conditions through motor 110. FIG. 3 illustrates a pneumatic system 200 in accordance with the principles disclosed herein. Pneumatic system 200 is identical to pneumatic system 100 except that motor 110 is replaced with a motor 210. Motor 210 is configured such that compressed air flow through motor 210 is substantially isothermal. In other words, the temperature of compressed air passing through motor 210 remains substantially unchanged. Like motor 110, motor 210 enables a pressure reduction of the compressed air flowing therethrough and enables the production of mechanical energy, or work, that may be used in some manner. As such, motor 210 is also considered an efficient regulator.

The amount of work produced by motor 210, $W_{prod,210}$, may be calculated using the First Law of Thermodynamics, which under the assumed conditions, simplifies to:

$$W_{prod,210} = \dot{m}*(h_5-h_1) \quad (4)$$

where $h_1$ is the enthalpy of compressed air provided by source 15 to motor 110; $h_5$ is the enthalpy of compressed air exhausted by motor 210; and $\dot{m}$ is the flow rate of compressed air through pneumatic system 200. In pneumatic system 200 illustrated by FIG. 3, equation (4), and equation (5), defined below, the subscript "5" denotes a property of compressed air exiting motor 210 and entering motor 20. The subscript "1" remains as defined above. The subscript "6" denotes a property of compressed air exiting motor 20.

Assuming motor 210 is configured to produce the same pressure reduction in compressed air passing through it as regulator 25 and isothermal flow through motor 210, the properties of compressed air entering motor 20 from motor 210 are: $P_5=P_1-19$ MPa=1 MPa, $T_5=T_1=300°$ K. (given), $h_5=298.30$ kJ/kg, and $s_5=6.20$ kJ/kg. The work produced by motor 210, $W_{prod,210}$, is then estimated to be 345 hp, assuming the same flow rate $\dot{m}$ through pneumatic system 200 as that through pneumatic system 100. Hence, replacement of isentropic motor 110 with isothermal motor 210 enables an increase of 133 hp in useful work beyond that produced by isentropic motor 110, as well as an increase of 345 hp in useful work beyond that produced by regulator 25, which is none.

The amount of work produced by motor 20, $W_{prod,20}$, may be calculated using the First Law of Thermodynamics, which under the assumed conditions, simplifies to:

$$W_{prod,20} = \dot{m}*(h_6-h_5) \quad (5)$$

where $h_6$ is the enthalpy of compressed air exiting motor 20. Assuming isentropic flow through motor 20 and that motor 20 is configured to exhaust compressed air at a pressure of 0.2 MPa, the properties of compressed air exiting motor 20 are: $s_6=s_5=6.20$ kJ/kg, $P_6=0.2$ MPa (given), $h_6=188.82$ kJ/kg, and $T_6=188.82°$ K. The work produced by motor 20, $W_{prod,20}$, is then estimated to be 148 hp, an increase of 93 hp beyond that produced by motor 20 when driven by compressed air from isentropic motor 110 or regulator 25. In other words, replacement of isentropic motor 110 or regulator 25 with isothermal motor 210 enables the work produced by motor 20 to nearly triple.

Work produced by motors 20, 210 is dependent upon the flow rate of compressed air supplied to each. Increasing the flow rate also increases the work produced by these devices. Thus, increasing the flow rate $\dot{m}$ through system 200 will enable an increase in the production of useful work from motor 20. In some circumstances, such an increase in the flow rate $\dot{m}$ may not be possible, or may be undesirable, such as when source 15 contains a limited supply of compressed air. In such circumstances, the flow rate of compressed air to motor 20 may be increased by utilizing the work produced by motor 210 to add compressed air to pneumatic system 200.

Figure 4:
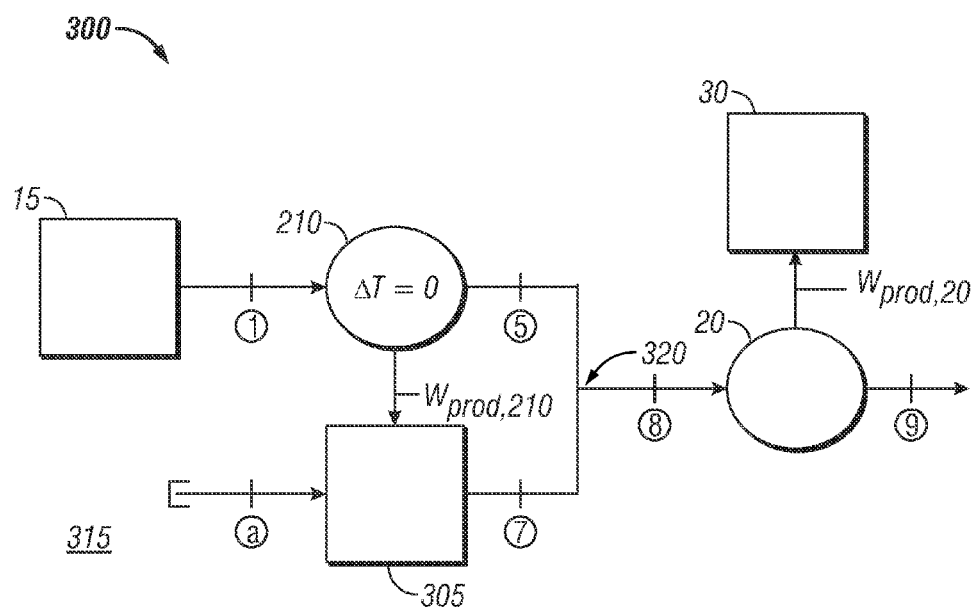
FIG. 4 is a schematic representation of a pneumatic system with a super efficient regulator in accordance with the principles disclosed herein.

FIG. 4 illustrates an embodiment of a pneumatic system 300 in accordance with the principles disclosed herein. Pneumatic system 300 is identical to pneumatic system 200, previously described, except a compressor 305 has been added. Compressor 305 is coupled to motor 210 and is powered by motor 210. During operation, air is drawn from the surrounding atmosphere 315 into compressor 305, compressed, and then exhausted. Compressed air exhausted by compressor 305 is then combined with compressed air exhausted by motor 210 prior to delivery to motor 20. In this manner, the flow rate of compressed air to motor 20, and therefore the work produced $W_{prod,20}$ by motor 20, is increased without changing the flow rate of compressed air supplied by source 15.

The amount of work produced $W_{prod,210}$ by motor 210 was previously determined to, be 345 hp. This work is used to power compressor 305. Compressor 305, in turn, draws in ambient air and compresses that air. Once compressed, the air exhausted by compressor 305 is mixed with compressed air provided by source 15 at a location 320 downstream of motor 210 and compressor 305. The mixture of compressed air from motor 210 and compressor 305 flows through motor 20, enabling motor 20 to produce work $W_{prod,20}$. Due to the increased flow rate through motor 20 resulting from the addition of compressed air by compressor 305, the work produced by motor 20 is increased relative to that produced by motor 20 in the absence of compressor 305. The increase in work produced by motor 20 is dependent upon the flow rate of compressed air through motor 20, which, in turn, is dependent upon the flow rate of compressed air exhausted by compressor 305. Thus, in order to determine the work produced by motor 20, the flow rate of compressed air exhausted from compressor 305 must first be determined.

Assuming isentropic flow through compressor 305, the flow rate of air $\dot{m}_c$ compressed by compressor 305 may be calculated using the First Law of Thermodynamics, which under the assumed conditions, simplifies to:

$$\dot{m}_c = W_{prod,210}/(h_7-h_a) \quad (6)$$

where $h_a$ is the enthalpy of air entering compressor 305 and $h_7$ is the enthalpy of compressed air exiting compressor 305; and $\dot{m}_c$ is the flow rate of compressed air exiting compressor 305. In pneumatic system 300 illustrated by FIG. 4 and equations (6) through (8), the latter two defined below, the subscript "a" denotes a property of ambient air entering compressor 305. The subscripts "1" and "5" remain as defined above. The subscript "7" denotes a property of compressed air exiting compressor 305 prior to mixing with compressed air exhausted by motor 210. The subscript "8" denotes a property of compressed air entering motor 20. The compressed air entering motor 20 is a mixture of compressed air exhausted by motor 210 and compressor 305, as will be discussed further. The subscript "9" denotes a property of compressed air exiting motor 20.

To determine the flow rate of air $\dot{m}_c$ compressed by compressor 305, the properties of compressed air entering and exiting compressor 305 must first be defined. Assuming the pressure and temperature of ambient air entering compressor 305 are $P_a=0.1$ MPa and $T_a=300$ K, respectively, the enthalpy of the ambient air $h_a$ is 300.30 kJ/kg, and the entropy of the ambient air $s_a$ is 6.87 kJ/kg. Assuming isentropic flow through compressor 305 and that the pressure of compressed air exhausted by compressor 305 is substantially equal to that of compressed air exhausted by motor 210, the properties of compressed air exiting compressor 305 are: $P_7=P_5=1$ MPa, $s_7=s_a$, $T_7=574.35$ K, and $h_7=580.50$ kJ/kg. Substituting the enthalpy of air $h_a$ entering compressor 305 and the enthalpy $h_7$ of air exiting compressor 305 into equation (6) above, the flow rate $\dot{m}_c$ of compressed air exiting compressor 305 is determined to be 0.92 kg/second.

Next, the amount of work produced by motor 20, $W_{prod,20}$, may be calculated using the First Law of Thermodynamics, which under the assumed conditions, simplifies to:

$$W_{prod,20}=(\dot{m}+\dot{m}_c)*(h_9-h_8) \quad (7)$$

where $h_8$ is the enthalpy of compressed air entering motor 20 and $h_9$ is the enthalpy of compressed air exiting motor 20. Due to the addition of compressed air to pneumatic system 300 by compressor 305, the flow rate through motor 20 is increased and equals the sum of the flow rate $\dot{m}$ of compressed air supplied by source 15 and the flow rate $\dot{m}_c$ of compressed air exhausted by compressor 305, not simply the former as in the case of pneumatic systems 100, 200.

In order to estimate the work $W_{prod,20}$ produced by motor 20, the state of compressed air both entering and exiting motor 20 must be defined. The compressed air entering motor 20 is a mixture of compressed air exhausted by motor 210 and compressor 305. Assuming mixing chamber conditions apply, meaning negligible heat transfer, work, and changes in potential energy, and kinetic energy, the enthalpy $h_8$ of compressed air entering motor 20 may be calculated:

$$h_8=(\dot{m}_c*h_7+\dot{m}*h_5)/(\dot{m}_c+\dot{m}) \quad (8)$$

Under the defined conditions, the enthalpy $h_8$ of compressed air entering motor 20 is 433.28 kJ/kg. Having determined the enthalpy $h_8$ of compressed air entering motor 20 and knowing the pressure $P_8$ compressed air entering motor 20, which is equal to the pressure of compressed air exhausted by motor 210 and compressor 305, the remaining properties of compressed air entering motor 20 may be determined: pressure $P_8=P_5=P_7$, entropy $s_8=6.58$ kJ/kg, and temperature $T_8=432.15°$ K.

Next, assuming isentropic flow through motor 20 and that motor 20 is configured to exhaust compressed air at a pressure of 0.2 MPa, the properties of compressed air exhausted by motor 20 are: entropy entropy $s_9=s_8$, pressure $P_9=0.2$ MPa (given), temperature $T_9=273.12$ K, and enthalpy $h_9=273.00$ kJ/kg. Substituting the enthalpies $h_9$ and $h_8$ and the flow rates $\dot{m}_c$ and $\dot{m}$ into equation (7) above, the work $W_{prod,20}$ produced by motor 20 is determined to be 412 hp, approximately 7.5 times the amount of work produced by motor 20 when driven by compressed air from isentropic motor 110 or regulator 25 in the absence compressor 305 and approximately triple the amount of work produced by motor 20 when driven by compressed air from isothermal motor 110 in the absence compressor 305.

In some applications, it is desirable to maintain the work produced by motor 20 $W_{prod,20}$ at a substantially constant level due to constraints imposed by device 30. For example, it may desirable to provide mechanical energy to device 30 at a substantially constant rate of 55 hp. As demonstrated above, pneumatic system 100 is configured to provide 55 hp of mechanical energy to device 30 when compressed air is provided from source 15 to motor 110 at a flow rate of 1 kg/second. Assuming the same flow rate of compressed air from source 15 to motor 110, pneumatic system 200 is configured to provide 148 hp of mechanical energy to device 30. Similarly, assuming the same flow rate of compressed air from source 15 to motor 210, pneumatic system 300 is configured to provide 412 hp of mechanical energy to device 30. Because significantly less mechanical energy is desired for device 30, the flow rate of compressed air supplied by source 15 to motor 110 of pneumatic system 100 and to motor 210 of pneumatic system 200 may be reduced to a level that enables motor 20 to produce only 55 hp. This enables less compressed air to be consumed from source 15. In applications where source 15 contains only a limited supply of compressed air, such as a portable tank having a finite storage volume, utilizing compressed air from source 15 at a lower rate enables device 30 to be powered for longer periods of time before source 15 is depleted. This is particularly desirable in applications where refill or replacement of source 15 is difficult or inconvenient, for instance in subsea applications.

As described, motor 210 enables pressure reduction of compressed air supplied by source 15 and produces useful work that drives compressor 305. Compressor 305, in turn, increases the flow rate of compressed air to motor 20 without increasing the flow rate of compressed air from source 15, and enables a reduction in the consumption rate of compressed air from source 15. For these reasons, the combination of motor 210 and compressor 305 is considered a super efficient regulator.

Figure 5:
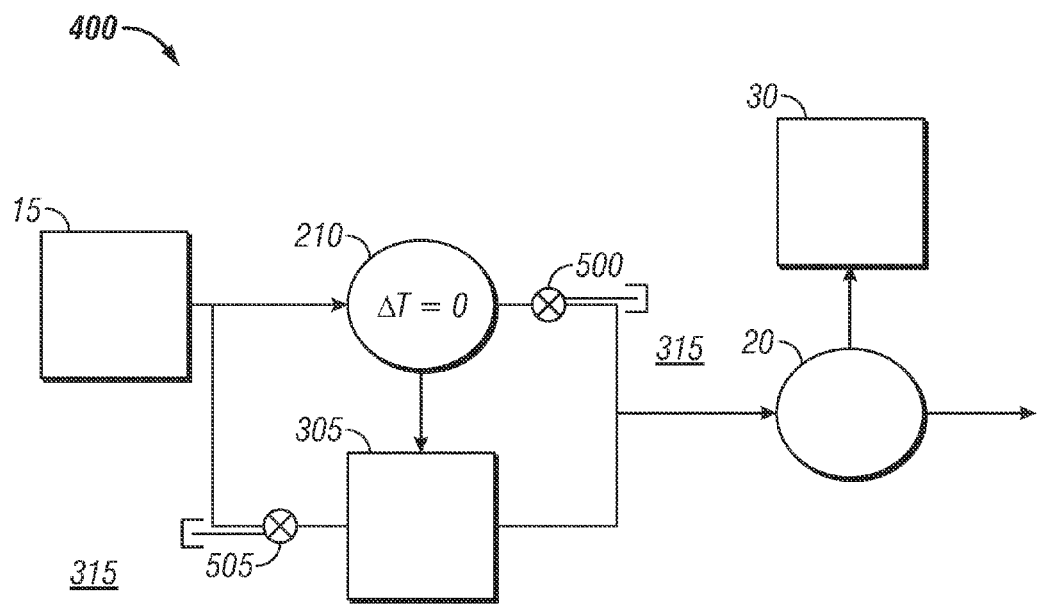
FIG. 5 is a schematic representation of a pneumatic system with the super efficient regulator of FIG. 4 and valving to enable continued operation when the compressed air source is depleted.

In some embodiments of the pneumatic system, wherein source 15 provides only a limited supply of compressed air, the pneumatic system may further include valves that enable continued operation of motor 210 when source 15 is depleted. FIG. 5 illustrates an embodiment of one such pneumatic system. Referring to FIG. 5, pneumatic system 400 is identical to pneumatic system 300 but for the addition of two valves 500, 505. Valve 500 is coupled to motor 210 and is actuatable between two positions. In one position, or a first position, fluid communication is provided between motor 210 and motor 20. In the other position, or second position, fluid communication is provided between motor 210 and the surrounding atmosphere 315. Valve 505 is coupled to compressor 305 and is also actuatable between two positions. In one position, or the first position, air is drawn from the surrounding atmosphere 315 into compressor 305. In the other position, or second position, air is drawn from source 15 into compressor 305.

During operation of pneumatic system 400, valve 500 is in its first position, and compressed air is delivered from source 15 through motor 210 to motor 20, as previously described in connection with pneumatic system 300. Also, valve 505 is in its first position, and ambient air is drawn into compressor 305, compressed, and exhausted to motor 20. When source 15 is depleted such that the pressure of compressed air supplied to motor 210 is lower than necessary to drive motor 210, valves 500, 505 are actuated from their first positions to their second positions. The pressure differential between source 15 and the surrounding atmosphere 315 drives motor 210. In turn, motor 210 drives compressor 305, which draws in air from source 15, compresses it, and discharges the compressed air to motor 20. Thus, valves 500, 505 enable continued operation of pneumatic system 400 when source 15 is depleted below levels needed to drive motor 210.

In the above-described embodiments, the working fluid is air. However, in other embodiments of pneumatic systems 100, 200, 300, 400, the working fluid may be another type of gas, such as but not limited to nitrogen. Furthermore, pneumatic systems 100, 200, 300 may be modified to use a liquid, such as but not limited to hydraulic oil or hydraulic water, as the working fluid. In such cases, compressor 305 would necessarily be replaced with a hydraulic pump. Because compressor 305 and the hydraulic pump increase the pressure of fluid received by each, these devices may also be referred to as fluid pressurization devices.

Figure 6:
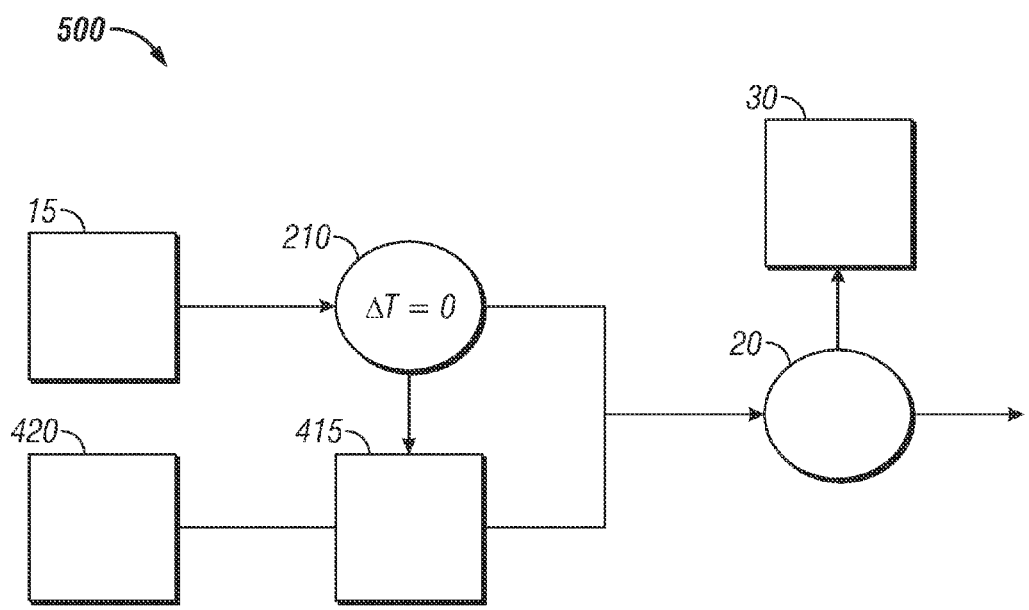
FIG. 6 is a schematic representation of a hydraulic system with a super efficient regulator in accordance with the principles disclosed herein.

FIG. 6 illustrates an embodiment of a hydraulic system in accordance with the principles disclosed herein. Hydraulic system 500 is similar to pneumatic system 300, previously described, except motors 20, 210 are adapted to be driven by liquid, rather than gas; compressor 305 has been replaced with a hydraulic pump 415; source 15 provides hydraulic fluid, rather than compressed air, and pump 415 draws in hydraulic fluid from another hydraulic fluid source 420. Pump 415 is coupled to motor 210 and is powered by motor 210. During operation, hydraulic fluid is drawn from source 420 into pump 415, pressurized, and then exhausted. Pressurized hydraulic fluid exhausted by pump 415 is then combined with hydraulic fluid exhausted by motor 210 prior to delivery to motor 20. In this manner, the flow rate of hydraulic fluid to motor 20, and therefore the work produced $W_{prod,20}$ by motor 20, is increased without changing the flow rate of hydraulic fluid supplied by source 15. Similar to pneumatic system 300, the addition of hydraulic fluid from another source 420 enables reduced consumption from source 15 and increases the length of time which device 30 may operate prior to depletion of source 15.

While various embodiments have been showed and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A method for producing mechanical energy, the method comprising:
   (a) conveying a first fluid through a first motor;
   (b) powering a fluid pressurization device with the first motor during (a);
   (c) increasing the pressure of a second fluid passing through the fluid pressurization device during (b);
   (d) combining all of the second fluid from the fluid pressurization device and all of the first fluid from the first motor to produce a combined fluid;
   (e) supplying all of the combined fluid to the second motor;
   (f) passing all of the combined fluid through the second motor; and
   (g) producing the mechanical energy with the second motor during (f).

2. The method of claim 1, further comprising:
   storing the first fluid in a first fluid source having a limited storage capacity;
   supplying the first fluid from the first fluid source to the first motor.

3. The method of claim 1, further comprising:
   drawing the second fluid from a source having a limited capacity into the fluid pressurization device.

4. The method of claim 1, further comprising:
   supplying the first fluid from a first fluid source to the first motor; and
   supplying the second fluid from the first fluid source to the fluid pressurization device.

5. The method of claim 1, further comprising:
   supplying the second fluid from the surrounding atmosphere to the fluid pressurization device.

6. The method of claim 1, further comprising:
   supplying the second fluid from the surrounding atmosphere to the fluid pressurization device during (d), (e), (f), and (g);
   supplying the second fluid from the first fluid source to the fluid pressurization device after supplying the second fluid from the surrounding atmosphere to the fluid pressurization device.

7. The method of claim 6, further comprising:
   passing the first fluid from the first motor through the second motor while supplying the second fluid from the surrounding atmosphere to the fluid pressurization device;
   passing the second fluid from the fluid pressurization device through the second motor while supplying the second fluid from the surrounding atmosphere to the fluid pressurization device.

8. A method, comprising:
   (a) flowing a first fluid from a first source through a first motor;
   (b) driving the first motor with the first fluid;
   (c) driving a fluid pressurization device with the first motor during (a) and (b);
   (d) flowing all of the first fluid from the first motor to a second motor;
   (e) flowing a second fluid from a second source through the fluid pressurization device during (c), wherein the second fluid source is different than the first fluid source;
   (f) increasing the pressure of the second fluid with the fluid pressurization device during (e);
   (g) passing all of the second fluid from the fluid pressurization device through the second motor; and
   (h) producing mechanical energy with the second motor during (d) and (g).

9. The method of claim 8, further comprising:
   (i) actuating a device with the mechanical energy produced during (h).

10. The method of claim 8, wherein the first source has a finite storage volume.

11. The method of claim 8, wherein the second source is the surrounding atmosphere.

12. The method of claim 8, wherein the first fluid and the second fluid are each air.

13. A method, comprising:
    (a) flowing a first fluid through a first motor;
    (b) driving the first motor with the first fluid;
    (c) driving a fluid pressurization device with the first motor during (a) and (b);
    (d) flowing a second fluid through the fluid pressurization device during (c);
    (e) increasing the pressure of the second fluid with the fluid pressurization device during (d);
    (f) flowing all of the first fluid from the first motor and all of the second fluid from the fluid pressurization device through a second motor; and
    (g) producing mechanical energy with the second motor during (f).

14. The method of claim 13, further comprising:
    supplying the first fluid from a first fluid source to the first motor; and
    supplying the second fluid from a second fluid source to the fluid pressurization device.

15. The method of claim 13, wherein the first fluid is supplied to the first motor from a first fluid source during (a) and the second fluid is supplied to the fluid pressurization device from a second fluid source during (d), wherein the first fluid source is different than the second fluid source.

16. The method of claim 15, wherein the first fluid source is a storage vessel and the second fluid source is the surrounding atmosphere.

17. The method of claim 15, further comprising:
(h) flowing the first fluid through the first motor after (f);
(i) driving the first motor with the first fluid during (h);
(j) driving the fluid pressurization device with the first motor during (h) and (i);
(k) supplying a third fluid from the first fluid source to the fluid pressurization device;
(l) flowing the third fluid through the fluid pressurization device during (i) and (k); and
(m) increasing the pressure of the third fluid with the fluid pressurization device during (l).

18. The method of claim 17, further comprising:
(n) flowing only the third fluid from the fluid pressurization device through the second motor during (m); and
(o) producing mechanical energy with the second motor during (n).

* * * * *